Dec. 9, 1947.     M. MARTHINSEN     2,432,329
ANTISKID DEVICE FOR VEHICLES
Filed Feb. 14, 1946     2 Sheets-Sheet 1

Inventor:-
Mods Marthinsen
by James R. McKnight
Attorney.

Dec. 9, 1947.    M. MARTHINSEN    2,432,329
ANTISKID DEVICE FOR VEHICLES
Filed Feb. 14, 1946    2 Sheets-Sheet 2

Inventor.
Mads Marthinsen
by James R. McKnight
Attorney.

Patented Dec. 9, 1947

2,432,329

UNITED STATES PATENT OFFICE 2,432,329

ANTISKID DEVICE FOR VEHICLES

Mads Marthinsen, Michigan City, Ind.

Application February 14, 1946, Serial No. 647,457

1 Claim. (Cl. 152—228)

My invention relates to an improved device for preventing the skidding of vehicles and is particularly adapted for automobile tires.

Among the objects of my invention is to provide an improved means for attachment to tires of vehicles for preventing skidding on snow and ice, and for ready attachment and adjustment of the device for use, and such other objects, advantages, and capabilities as will later more fully appear and which are inherently possessed by my invention.

While I have shown herein a preferred embodiment of my invention, yet it is to be understood that the same is susceptible of modification and change without departing from the spirit of my invention.

Figure 1:
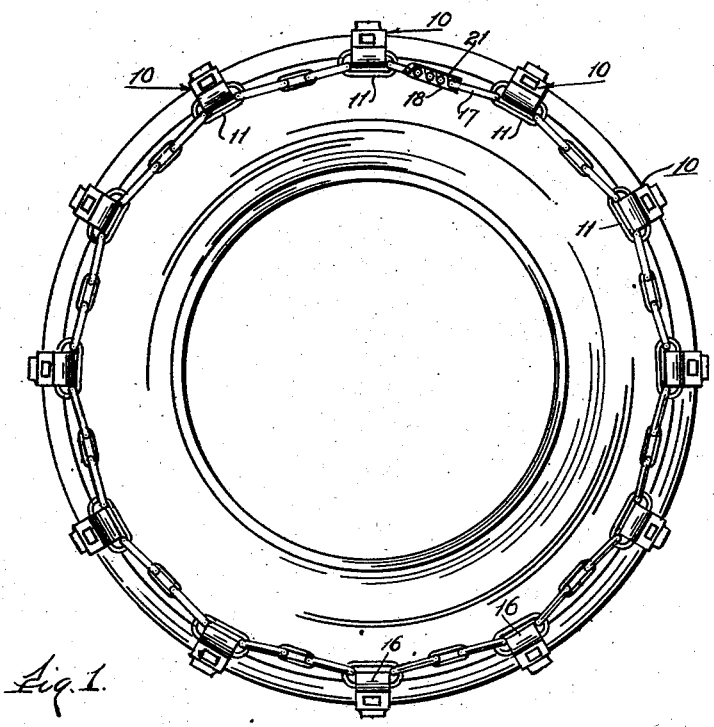
Figure 2:
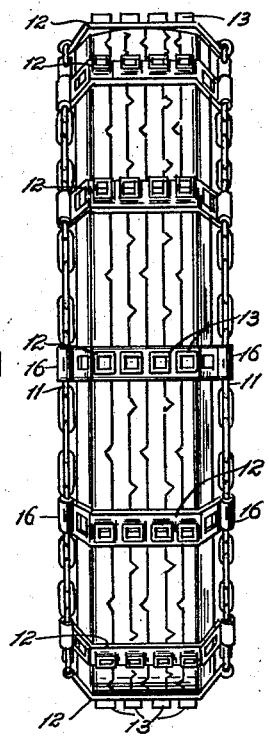
Figure 3:
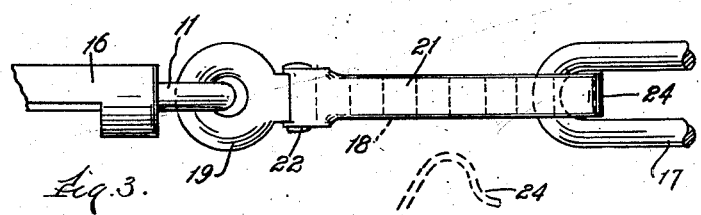
Figure 4:
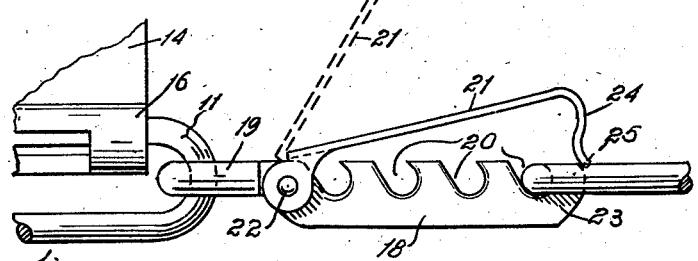
Figure 5:
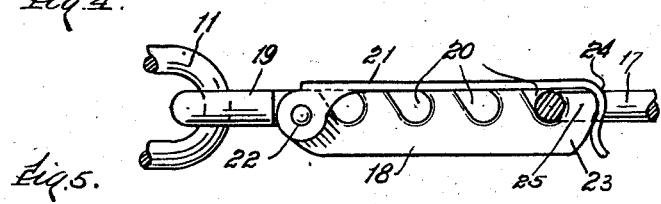
Figure 6:
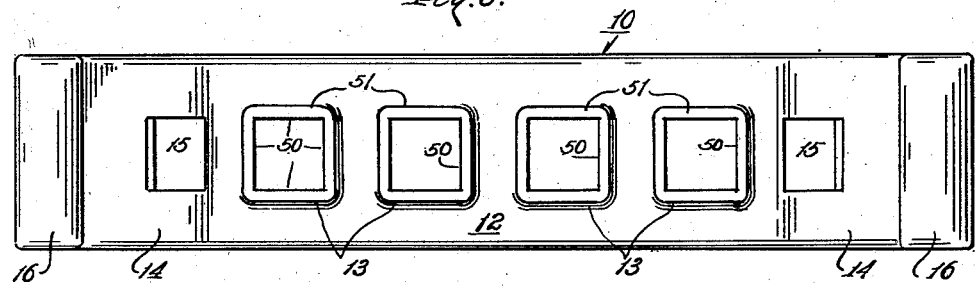
Figure 7:
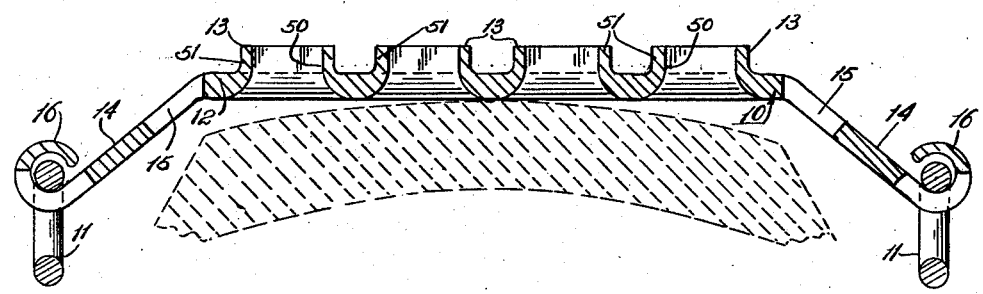
Figure 8:
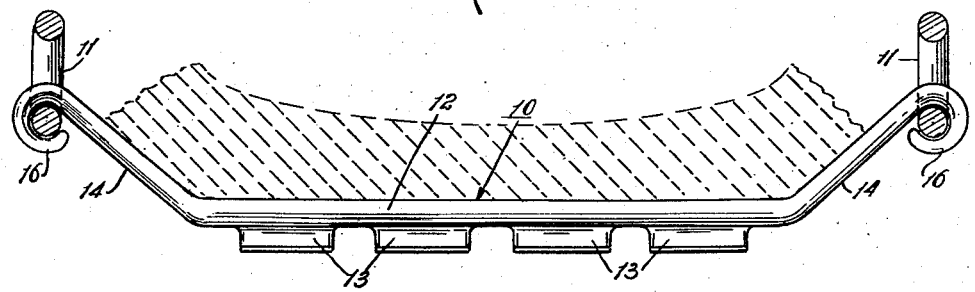
Figures 9, 10:
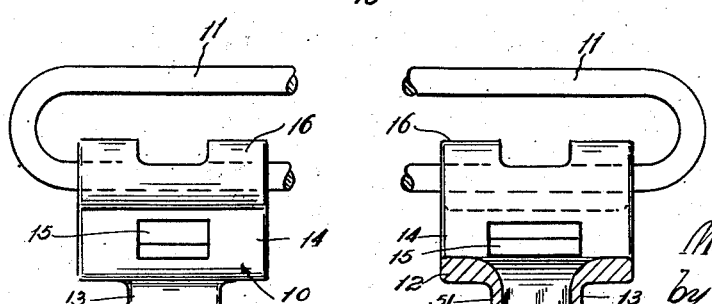

Referring more particularly to the drawings, Fig. 1 is a side elevational view of my device in use; Fig. 2 is a front elevational view of the same; Fig. 3 is an enlarged top plan view of an adjustment member; Fig. 4 is a side elevational view of an adjustment member in open positions; Fig. 5 is a similar view in locked position; Fig. 6 is a top plan view of a transverse member; Fig. 7 is a longitudinal view of a transverse member on top of a tire; Fig. 8 is a side elevational view of a transverse member showing the bottom of a tire; Fig. 9 is an end elevational view of an transverse member; and Fig. 10 is a detailed cross sectional view through one of the lugs.

The embodiment selected to illustrate my invention comprises a plurality of spaced transverse members 10 of narrow rectangular contour, connected by a plurality of links 11, said parts 10 and 11 being made of metal or other suitable material.

Each transverse member 10 has a substantially narrow oblong body portion 12, from the top surface of which integrally and outwardly extend a plurality of spaced hollow lugs or projections 13. I have found it preferable to have four such lugs as this greater number provides increased efficiency in operation, particularly in combination with a narrower body portion. My narrower gripper plates 10 reduce vibration in the use of my device on a car to a minimum.

My lugs 13 extend comparatively high above the top surface of body member 12 with the upper inner edges 50 of walls 51 sharpened. The walls 51 each curve outwardly and downwardly to the edges of the under surface of the body member or to adjoining similar walls forming rounded surfaces to aid in the ready expelling of ice and snow from the openings.

Each of my transverse members 10 is bent inwardly and downwardly at the opposite ends of the body portion 12 to form inclined portions 14. In each of the inclined portions, adjacent its inner end, is a cut out portion 15. The outer end of each inclined portion 14 is curved upwardly and outwardly on itself to form a holding portion 16.

A link 11 is positioned within each of said holding portions and is connected by other links 11 to form side chains spacedly holding the transverse members 10 in position.

To connect the ends of the device and adjust the same to a tire, I provide a pair of elongated links 17, linked to the links 11, which are attached to one end of the two end transverse members.

To the links 11 attached to the opposite end of the two end transverse members 10, I attach adjustment members 18 through integral rings 19.

Each adjustment member has a plurality of spaced curved notches 20, any one of which will receive the end of elongated link 17. A retaining member 21 has one end 22 hingedly attached to one end of the adjustment member 18, a body portion 23 extending beyond the notches 20, and a hook portion 24 at its other end adapted to removably engage by friction grip the end 25 of the adjustment member.

In use my plates contact the tire and by inclined portions engage the sloping portions of the tire to provide desired fit and prevent slipping. The curled ends of my plates are so positioned as to space the chains away from the tire so as to prevent general contact therewith, and thus save wear and tear.

My device is particularly efficacious in preventing cars on which it is used from getting stuck and stalled in the deep snow. The upper inner edges 50 of walls 51 always remain sharp due to their unique construction, thereby insuring gripping power at all times.

Having thus described my invention, I claim:

In an anti-skid chain for a tire, a transverse member having a narrow oblong body portion adapted to extend entirely across the tread of the tire and having a plurality of slightly spaced integral outwardly extending projections covering a substantial portion of the area of the body portion with the outer projections positioned adjacent the outer edges of the tread of the tire, each of said projections being hollow with an open top and bottom and having rounded inner walls curving downwardly and outwardly to the open bottom, said transverse member having opposite integral outer portions downwardly and inwardly inclined to correspond with and engage the shoulders of the tire, each of said outer portions having a rectangular cut out portion of substantial size, said outer portions curled inwardly on themselves at their ends to form link holding portions, said ends extending beyond and spaced from contact with the shoulders of the tire.

MADS MARTHINSEN.

REFERENCES CITED

The following references are of record in the file of this patent:

UNITED STATES PATENTS

| Number | Name | Date |
|---|---|---|
| 578,211 | Clark | Mar. 2, 1897 |
| 909,037 | Taylor et al. | Jan. 5, 1909 |
| 1,393,810 | Moss | Oct. 18, 1921 |
| 1,492,763 | Strohl | May 6, 1924 |
| 1,845,924 | Marthinsen | Feb. 16, 1932 |